United States Patent [19]
Seymour

[11] 3,776,708
[45] Dec. 4, 1973

[54] CONTROLLING THE SHAPE OF A SHEET OF GLASS DURING COOLING

[75] Inventor: Samuel L. Seymour, Oakmont, Pa.

[73] Assignee: PPG Industries, Inc., Pittsburgh, Pa.

[22] Filed: June 23, 1971

[21] Appl. No.: 155,873

[52] U.S. Cl.................................... 65/114, 65/348
[51] Int. Cl............................................ C03b 27/00
[58] Field of Search...................... 65/104, 114, 348

[56] References Cited
UNITED STATES PATENTS

| | | | |
|---|---|---|---|
| 3,298,809 | 1/1967 | Barch et al. ........................... | 65/106 |
| 3,256,080 | 6/1966 | Vranken ............................... | 65/104 |
| 3,310,273 | 3/1967 | Seymour............................. | 248/346 |

FOREIGN PATENTS OR APPLICATIONS

| | | | |
|---|---|---|---|
| 442,633 | 2/1936 | Great Britain......................... | 65/388 |
| 505,189 | 5/1939 | Great Britain......................... | 65/114 |

*Primary Examiner*—Arthur D. Kellogg
*Attorney*—Chisholm & Spencer

[57] ABSTRACT

Removing heated glass sheets outside a furnace introduces a temperature gradient along the length of the glass. This gradient induces thermal warpage when the glass transfers from a shaping station to a cooling station. The present invention compensates for this warpage by supporting the glass sheet in spaced relation between opposed outline guides having complementary shapes conforming to that desired for the glass sheet marginal portion during the cooling step that heat-strengthens the shaped glass. Care is taken to avoid continuous contact of the glass with either guide to avoid glass breakage during cooling. The shaped guides are separated from one another during cooling by a maximum distance equal to the glass thickness plus the tolerance limit established by the customer. The guides may be continuous or discontinuous.

22 Claims, 7 Drawing Figures

INVENTOR
SAMUEL L. SEYMOUR

ATTORNEYS

INVENTOR
SAMUEL L. SEYMOUR

BY
ATTORNEYS

CONTROLLING THE SHAPE OF A SHEET OF GLASS DURING COOLING

In the fabrication of shaped glass products such as curved windows for vehicles such as automobiles, aircraft, speed boats and the like, cover plates for cathode ray tubes, bay windows and the like, glass sheets are often shaped to their ultimate shape by press bending after they are heated to their deformation temperature by sandwiching the heat-softened glass sheets between a pair of press bending molds having complementary shaping surfaces conforming to the ultimate shape desired for the fabricated articles. An alternate well known method for shaping glass sheets to make such products involves gravity bending.

In gravity bending, one or more glass sheets are supported above a surface conforming to the shape desired for the bent glass and the supported glass sags by gravity to conform to the shape of the surface. Since the hot glass tends to become marked when it contacts a shaping surface, gravity type molds are usually of the outline type that engage only the marginal portion of the bent glass. Gravity sag molds of the outline type are described and claimed in U.S. Pat. No. 3,248,196 to Harold E. McKelvey. These outline type molds fail to control sag in the unsupported mold portion enclosed within the portion supported by the outline mold.

In press bending, heat-softened glass sheets are sandwiches between press bending molds of complemntary curvature. In press bending using so-called solid-type molds, the molds engage the opposite major surfaces of the glass throughout approximately their entire extent as in U.S. Pat. No. 3,367,764 to Samuel L. Seymour. Frame type pressing molds engage glass sheets in their marginal portions only as in U.S. Pat. No. 3,256,080 to Jean Vranken. A combination of a solid mold engaging one side over approximately its entire extent and a frame mold engaging the other side in its marginal portion only is shown in U.S. Pat. No. 3,123,459 to Carl Hens.

Each of these press bending operations has its drawbacks. The mold surface tends to impress any irregularities into the glass surface to a greater extent when both major surfaces are engaged simultaneously throughout their extent by solid type molds during press bending. Such treatment can cause ptical defects in the vision area of the finished product.

Using frame molds instead of solid type molds avoids optical defects due to mold contact in the vision portion. However, peripheral engagement only of the glass fails to control the shape of the intermediate region of the glass any better than gravity sag bending using an outline type mold.

When a hot glass sheet is press bent between a solid-type press bending mold and a frame-type press bending mold, there is less marring of the viewing portion of the bent glass sheet than when the glass is pressed between two solid-type molds. However the opposite surfaces of the glass sheet cool to different temperatures above the strain point during shaping. Then, the bent glass sheet warps thermally when it cools to a symmetrical temperature gradient below the strain point of the glass. In the past, attempts were made to compensate for this qarpage by press bending the glass to a shape different from the ultimate shape. However, this technique met with limited success because of the difficulty in maintaining uniform the many parameters such as the heating pattern in the furnace, mold temperatures, uniformity of glass thickness, etc., that determined the amount of compensation needed for each bent glass sheet pattern.

High speed mass production of bent tempered parts dictates that the glass sheets be shaped in one location and chilled rapidly at another location. Otherwise, if a glass sheet is chilled to below its strain point at the same station as where it is shaped, production must be slowed to enable a glass sheet undergoing heating in a furnace preparatory to its being shaped to await the completion of an entire shaping and tempering operation of a preceding sheet before it can leave the furnace. Transferring a shaped sheet to a different location for cooling frees the shaping station much more quickly for a subsequent glass sheet to be processed.

When glass sheets are shaped at a shaping station slightly beyond the exit of a furnace and immediately transferredto a cooling station while the transferred glass sheet is still at a temperature sufficient for tempering, its leading edge along the direction of movement faces a relatively cold atmosphere while its trailing edge faces a relatively hot atmosphere of the furnace. Consequently, the shaped glass tends to develop a warp from leading edge to trailing edge and the tempered glass is difficult to conform to tolerance requirements by compensating the shape of the glass engaging surfaces of the shaping molds to impart an initially erroneous shape that is corrected by warpage to the desired shape.

In U.S. Pat. No. 3,256,080 to Vranken, it suggests that the frame type pressing molds that engage the glass during the shaping continue to engage the shaped glass about its marginal portion while the major surfaces of the shaped glass sheet are chilled with moving blasts of air. Such a technique inherently produces a rlatively slow operation.

In an attempt to avoid the longitudinal warpage resulting from transferring the glass from a shaping station disposed near the heating furnace to a chilling station, it had been proposed to engage the opposite major surfaces of the shaped glass between auxiliary shaping frames in the chilling station to help restore the shape of the glass sheet from its warped condition on its arrival at the cooling station to tis desired shape. Unfortunately, such simultaneous contact with the opposite surfaces during chilling causes glass breakage during chilling. Such glass breakage made it impossible to speed up the shaping and tempering operation from the limited rate of production imposed by the limitations of the Vranken patented apparatus.

SUMMARY OF THE PRESENT INVENTION

The present invention suggests a novel glass sheet treatment to restore the shape of press bent glass sheets from the warped shape induced during the transfer from the shaping station to the cooling station to a more desirable shape approximating the exact shape desired within tolerance limits. To accomplish this end, the present invention uses means (such as tongs) for supporting the glass sheets in an upright position in such a manner that the support means leaves substantially the entire peripheral edge surface of said supported glass sheets exposed in combination with opposed, contoured glass guiding elements spaced inward of the tempering medium supply means of the cooling station and movable between a retracted position and a closed position. The guiding elements comprise opposed tempering rings or a series of discontinuous ring portions having curved surfaces conforming to the shape desired for only the marginal portion of the glass and free of any structure within the outline of said rings or ring portions. The guiding elements are disposed on opposite sides of the shaped glass and are held in very close proximity to the major surfaces of the glass sheet during the cooling step.

The contoured guiding elements in the form of rings or ring portions are kept from simultaneously engaging the opposite major glass sheet surfaces, although they are supported in close relation thereto, preferably by being inhibited from approaching one another closer than the glass sheet thickness plus the tolerance in shape permitted by the customer. Since the contoured guiding elements have shapes conforming to the final curvature desired for the marginal portion only of the shaped glass sheets, as the guiding elements approach the glass during the initial stage of chilling while the glass sheet is still in a deformable condition, one and only one of the guiding elements at a time contacts the marginal portion only of the warped glass to correct its shape tto conform to the shape of the guiding elements.

Chilling medium such as air blasts used to cool the glass to below its deformation temperature is initially applied at different rates against the opposite surfaces of the bent glass sheet. This initial differential application of chilling medium forces the glass sheet marginal portion against one of the contoured guiding elements and simultaneously in spaced relation to the other guiiding element to help conform the glass shape to the contour of the one guiding element.

As the glass rests with one major surface against the one guiding element and the other major surface out of contact with the other guiding element, the first major surface of the glass sheet resting against the one guiding element forms a chamber with limited escape for tempering medium between the one major surface and the one contoured guiding element. The position causes an increase in pressure within the chamber thus formed. At the same time, the pressure of the tempering medium against the opposite major glass sheet surface spaced from the other guiding element is reduced because the space between the other major glass sheet surface and the other guiding element permits tempering medium applied to the other major surface to escape through said space. The supported glass sheet is thus forced into a position where its other major surface momentarily engages the other guiding element with its one major surface out of contact with the first guiding element. The process of pressure build-up is repeated on alternate sides of the glass so that the shaped glass oscillates between the limits permitted by the spacing between the guiding elements and permits at least intermittent flow of tempering medium between each major surface of the glass sheet and the shaped guiding element said surface faces during cooling. Surprisingly, this treatment apparently restores the shape of the warped glass to within tolerance limits while avoidung glass breakage experienced with simultaneously engaging both surfaces during cooling.

Each guiding element is preferably a continuous rail or discontinuous rail portions having shaped edges conforming to the shape desired for the glass near its margin. FIne mesh screen material surrounds the glass facing edge of each rail to minimize heat exchange between the rail and the glass while throttling free flow of air blasts between the glass and the rail against which the glass sheet happens to be positioned momentarily during the cooling.

The manner by which the present invention accomplishes its desired results of providing mass production of press bent and cooled glass articles shaped within desired tolerance limits with virtually no loss due to said breakage will be better understood from a detailed description of a preferred embodiment and modifications thereof that follows.

BRIEF DESCRIPTION OF THE DRAWINGS

In the drawings that form part of the description of a preferred embodiment and wherein like reference numbers refer to like structural elements.

DESCRIPTION OF THE PREFERRED EMBODIMENTS

Figure 1:
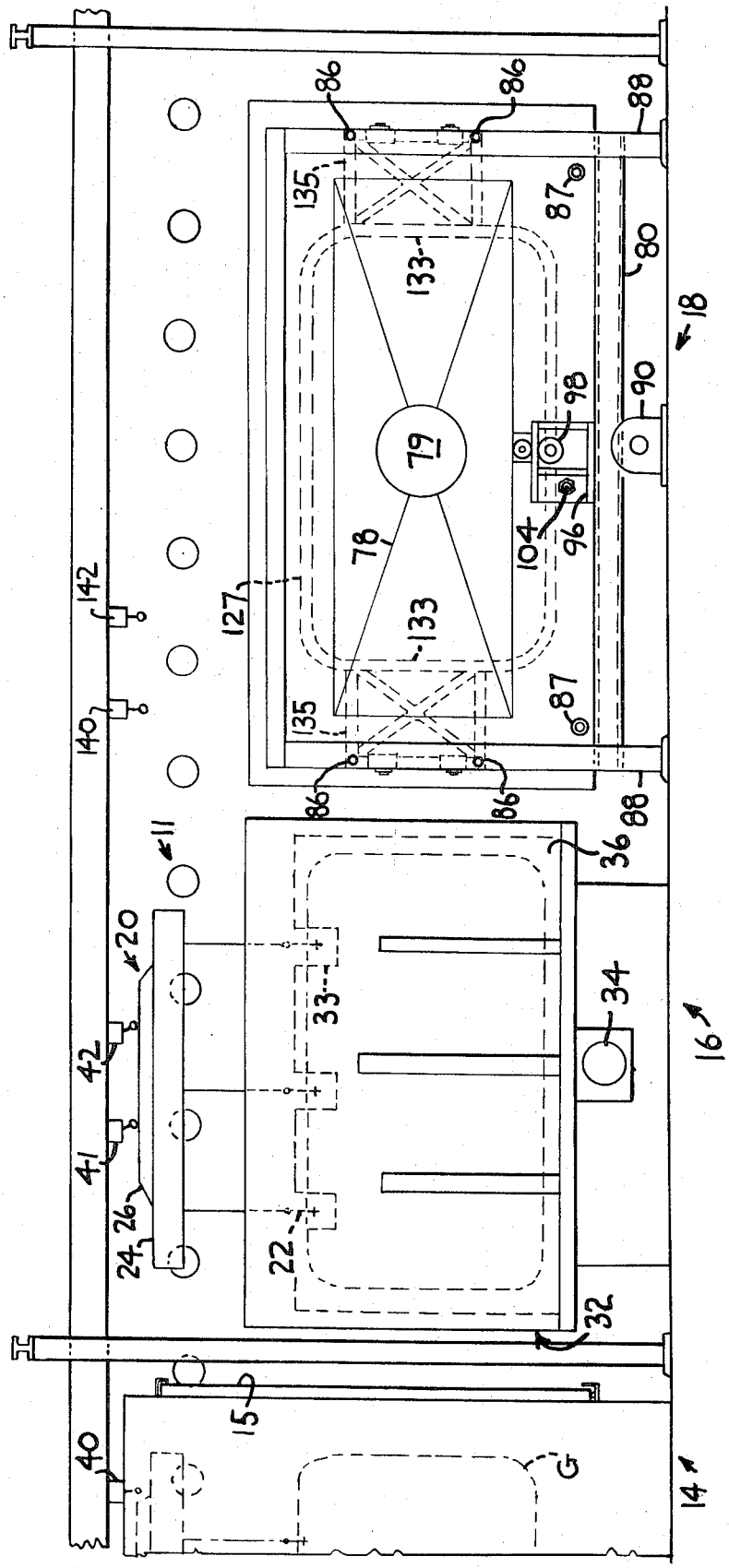
FIG. 1 is a longitudinal assembly view of a preferred embodiment of apparatus for shaping and cooling said shaped glass sheets modified by the present invention, ith certain elements omitted to show certain elements clearly.

Referring particularly to FIG. 1, a conveyor 11 is shown extending in a horizontal direction through a tunnel-like furnace 14, a shaping station 16 and a cooling station 18. The conveyor 11 is conventional for this type of apparatus and comprises a series of rolls arranged in sections in end-to-end relation to one another. Each section is selectively driven by a clutch (not shown). The rolls are mounted on a conventional support means for rotation. The rotating rolls support a series of carriages 20 for controlled movement in a manner well known in the art to cause the glass sheets to move along a given horizontal path while the sheets are suspended in a vertical plane.

Each carriage 20 is provided with a number of tongs 22 of the self-closing type, preferably of the type described in U.S. Pat. No. 3,089,727 to William J. Hay, that grip a glass sheet G to be treated, the number and arrangement of the tongs being determined by the size and shape of glass sheet undergoing treatment. The carriage has an upper rail 24 that rides on the conveyor rolls. A cam 26 is mounted on the upper rail 24 to engage and disengage various limit switches whose operation is well known in the art to control the timing sequence for operating various elements fo the conveyor, the shaping station and the cooling station intermittently as required.

The furnace 14 is provided with heating elements arranged along its opposite walls to heat a succession of glass sheets G conveyed through the furnace. The amount of heating provided through the heating elements is correlated with the time it takes for a glass sheet to traverse the furnace 14 so that the glass sheet G is at least at its deformation temperature when it arrives at the shaping station 16. The furnace includes a limit switch that controls a timer circuit (not shown) that controls the opening of an exit 15 from the furnace and the operation of a high speed conveyor section that transfers the carriage that happens to be the leading carriage 20 of a series of carriages in the furnace at the time to a desired position at the shaping station 16, as is conventional.

The shaping station 16 comprises a pair of press bending molds 32 having glass engaging members with notched-out upper portions 33 to provide clearance for receiving the glass gripping tongs 22. The glass engaging members have shaping faces complementary to the shape to be imparted to the deformable glass sheets. The molds are movable between a retracted position on either side of the given path traversed by the glass sheets G along conveyor 11 to a glass engaging position. Piston assemblies 34 are attached to the rear of large plates 36, which, in turn, are fixed to the rear of each mold 32, respectively, to move the molds between a retracted position and a glass engaging position in a manner well known in the art.

The solid-type male mold 32 may be of the type covered by U.S. Pat. No. 3,367,764 to Samuel L. Seymour and comprises a relatively flexible shaping plate about one-fourth inch thick of hot rolled steel having an outer shaping face of desired contour, a relatively rigid plate thicker and slightly larger than shaping plate (composed of one-half inch thick cold rolled No. 1018 carbon steel) behind the latter, with a series of connecting elements adjustable in length connecting spaced points along the rear surface of the shaping plate to corresponding shaped points along the front of the rigid plate so that adjusting the length of each connecting element changes the configuration of the shaping face in the vicinity of the adjusted connecting element whenever localized changes in shape are needed.

In order to protect the hot glass sheet G from direct contact with the metal of the shaping plate, a cover of knit fiber glass cloth is provided in direct contact over the shaping face. A series of closely spaced clamps is mounted around the periphery of the rigid plate, to clamp the cover in position where it is in unwrinkled condition over the shaping surface that it covers. The cover is preferably formed by knitting textured fiber glass yarn as disclosed in U.S. Pat. No. 3,148,968 to James H. Cypher and Clement E. Valchar.

A frame-type press bending mold may be used instead of one or both of the solid-type pressing molds 32. A frame-type mold is adjustably connected to a rigid rear plate in a manner similar to the connection between a solid type mold and its rigid plate. The latter is attached rigidly to a piston 34.

Initially, the hot glass sheets G coming from the furnace 14 into the shaping station 16 must be protected against direct contact with the relatively cold metal of the shaping frame. Consequently, a fiber glass cover extends completely across the opening and aroung te margin of the frame-type press and has a series of clamps securing the end portion of the fiber glass cover to the nearest connectors. The cover for the frame-type female mold is preferably of the same material as the cover which covers a solid-type shaping mold 32.

The cooling station 18 (FIGS. 1, 2 and 3) comprises opposing arrays of nozzles 70 and 71 having the usual adapters to adjust their length so that the inner ends of the nozzles lie along curved surfaces parallel to the shape of the glass to be cooled, such as disclosed in U.S. Pat. No. 3,574,589 to George E. Yockey. The nozzle arrays extend inward toward one another through apertured spacer plates 72 and 74. The latter are fixed by connections 73 and 75 to a pair of plenum chambers 76 and 78, which are located on opposite sides of a vertical plane through conveyor 11. The plenum chambers communicate with a source of air under pressure through flexible couplings 79. Suitable valve means (not shown) are provided in the air supply system to control the pressure supply to the plenum chambers 76 and 78. The plenum chambers are slidably supported on a base frame 80 having front and rear cross beams 81 interconnecting longitudinally extending side platforms 82. The base frame 80 is below the cooling station 18. Vertical reinforcing posts 84 for each plenum chamber are slidably supported for movement longitudinally of the cross beams 81 by having their lower ends fixed to slides 85 slidable on cross beams 81.

Guide bars 86 extend horizontally rearward along the opposite sides of each plenum chamber through horizontal slots in slotted guide posts 88. Each guide bar has slotted rings 103 slidably supported along the vertical edges of a rear wall 102 reinforcing a plenum chamber 76 or 78 and extends rearward through the slots in guide posts 88. This arrangement permits the guide bars 86 freedom of horizontal movement with the respective plenum chambers 76 and 78 and enables the plenum chambers to move toward and away from one another relative to the base frame 80. Additional guide bars 87 are slidably received in apertures at the outer, bottom portions of the extensions 89 of a front wall reinforcement of the plenum chambers 76 and 78 to align the plenum chambers during movement.

A motor 90 acting through a drive shaft 92 and eccentric cams 94 supports the base frame 80 and its supported plenum chambers 76 and 78 for vertical movement so as to cause the plenum chambers 76 and 78 to reciprocate vertically while guide bars 86 remain fixed in their vertical position defined by the horizontal slots in guide posts 88.

Each of the longitudinal platforms 82 supports an angled bracket member 96 on which bracket is mounted a piston 98. Each piston has a rod 100 extending inward from the piston, the inner end of which rod is secured to a reinforcing wall 102 of one or the other of the plenum chambers 76 or 78. A pair of externally threaded rods 104 (only one of which is shown for each piston) flanks each piston rod. The bracket 96 includes an apertured vertical wall 97 having apertures to provide clearance for moving the piston rod 100 and the flanking, externally threaded rods 104 through the vertical wall 97.

The threaded rods 104 are attached to the respective reinforcement wall 102 and extend outward therefrom on opposite sides of an associated piston rod 100 so as to move in concert with the piston rod 100 and the reinforcing wall 102 whenever pistons 98 are actuated. Stop nuts 106 are provided on the externally threaded rods 104 to limit the retracted position of the pistons and additional stop nuts 108 are provided on the externally threaded rods to limit the innermost position of the piston rod 100. Whenever piston rod 100 is moved, by actuation from piston rod 98, it causes the plenum chambers 76 and 78 and their associated arrays of nozzles 70 and 71, respectively, to move between a retracted position defined by the abutment of stop nuts 106 along threaded rods 104 with the apertured vertical wall 97 of bracket 96 and a closed position as defined by the abutment of the stop nuts 108 along the externally threaded rods 104 against the apertured vertical wall 97. Adjustment of the positions of stop nuts 109 is made such that the inner ends of the nozzles 70 and 71 are approximately 5 to 8 inches from one another in the closed position.

The motor 90 through driven shaft 92 and eccentric cams 94 causes the plenum chambers 76 and 78 together with their associated nozzle arrays 70 and 71 to reciprocate vertically while air under pressure is discharged against the opposite surfaces of glass sheets suspended by tongs. The position of the inner end of each nozzle 70 or 71 may be adjusted by sliding its attached adapter relative to its main nozzle until the free inner ends of the adapters reach such positions that each array of nozzles provides parallel shapes conforming to the shape of the bent glass sheet to be cooled. The blast emanating from each nozzle defines a moving area of cooling. Each of these areas overlaps the areas of cooling provided by air blasts from adjacent nozzles. This overlapping is both hroizontal and vertical so that the entire surface of the glass sheets is covered with air blasts to provide unfiorm cooling.

Figure 4:
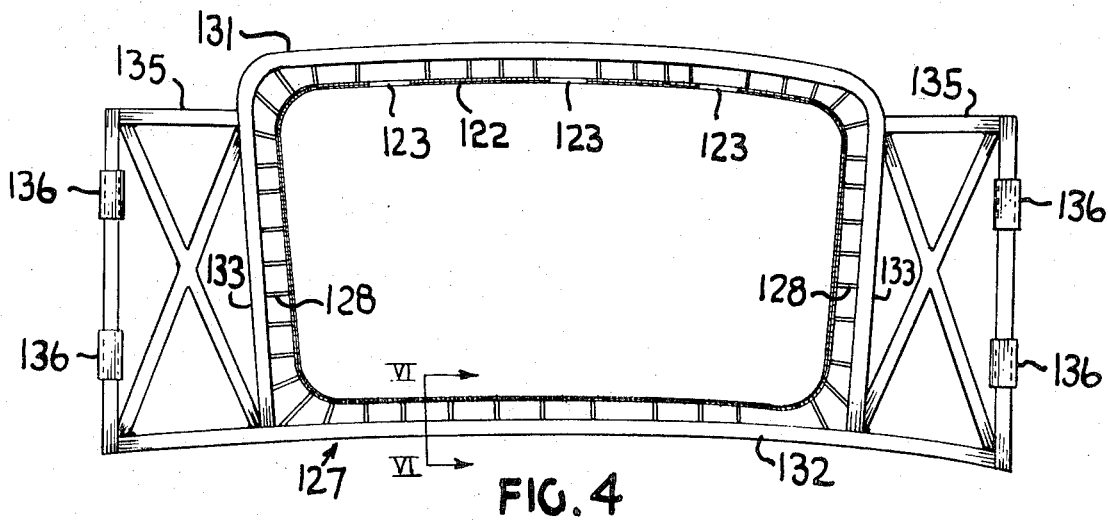
FIGS. 4 and 5 are fragmentary enlarged views of two embodiments of tempering rings that form important elements of the present invention.

The cooling apparatus also comprises a glass guiding member located forward of each nozzle array 70 and 71. Tempering rings 120 and 130 of outline configuration conforming to the marginal portion of one or the other of the glass sheet surfaces are illustrated as one embodiment of glass guiding member in FIG. 4, each connected to four guide bars 86 in a manner to be described. The ring 120 is disposed in front of plenum chamber 76 and between plenum chamber 76 and the path of glass sheet travel defined by the conveor 11, while ring 130 is disposed in similar position in front of plenum chamber 78. While a continuous ring is depicted in FIG. 4, it is understood that a series of spaced ring sections may be substituted depending on the severity of curvature of the glass sheet treated.

The tempering ring 120 or 130 is vertically disposed and comprises a metal rail 122, preferably of stainless steel. Tong receiving notches 123 are provided along its upper portion. Its surface 124 facing the path or course travelled by the glass sheets is serrated. The edge surfaces that are serrated have complementary shapes conforming to the shape and outline of a press bent sheet, except that the edge surface 124 of the continuous rail 122 of each glass guiding member embodied by tempering ring 120 or 130 defines a shape spaced slightly inward (about five-sixteenths inch) from the entire perimeter of the treated glass sheet. It is inherent from the structure of the tempering rings just described that the edge surfaces of the glass sheet are completely exposed when the glass sheet is aligned between the tempering rings, and it is readily seen from the drawings that the tempering rings are free of any material within the outline of each ring that would interfere with the unimparied flow of tempering medium within the outline of the tempering rings 120 or 130 against the major surfaces of a shaped glass sheet undergoing cooling. Rail 122 also has apertures 125 of a size and shape sufficient to cooperate with the edge serrations to reduce the heat capacity of the rail and minimize the thermal conductivity between the glass and the metal rail, which, if uncontrolled, is likely to fracture the glass sheet G on contact. In addition, thin wire mesh 126 is draped in the form of a channel over the edge surface 124 to further minimize heat transfer between the glass and the metal rail. Wires 129 are wound around the rails and through the mesh 126 to secure the thin mesh in place on the serrated rail 122.

The tempering ring 120 also includes means to provide structural rigidity for the rail 122. This latter means comprises an outrigger support pipe 127 and suitable connecting rods 128 that interconnect the reinforcing outrigger pipe 127 with the outer surface of rail 122 in a position spaced as far as possible from the serrated edge 124 of the latter. The reinforcement pipe 127 surrounding tempering ring 120 or 130 comprises top and bottom pipe portions 131 and 132, respectively, and side portions 133.

Each of the side portions 133 is connected to an outrigger 135 extending outward of the opposite side portions 133. The outrigger provides additional reinforcement for the heavy pipe reinforcement 127 and includes a pair of T-connections 136 for each outrigger 135. The T-connections are connected through pivotable connections 137 to rods 138, which are adjustably connected to blocks on a slotted bracket 140 through plates 142 and set screws 144. Each vertical brakcet 140 is disposed outside an opposite side of each nozzle array 70 or 71.

Spring loaded rods 146 attached to wall extensions 89 extend through bearing collars 147 carried by the slotted brackets 140. Set screws 148 are mounted on the front ends of each rod 146 to fix the innermost position of the vertical brackets 140 relative to the wall extension 89. However, the springs mounted around the rear portions of the rods 146 permit the tempering rings 120 and 130 to yield in response to a force such as provided by a glass sheet forced against one of the tempering rings 120 or 130. Plates 150 connect rods 86 and 146.

Figure 2:
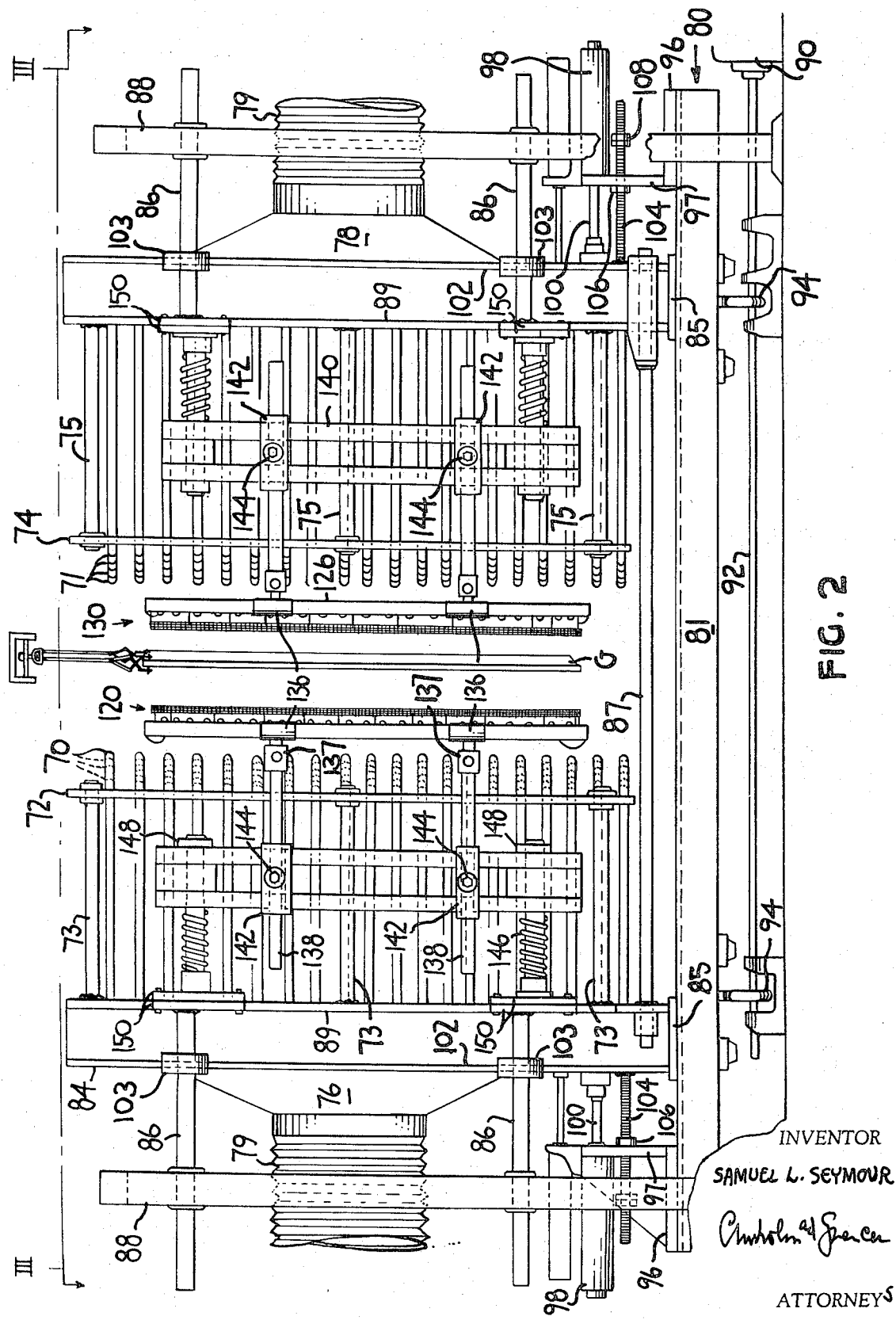
FIG. 2 is an end view of the cooling station of FIG. 1 with certain parts omitted to show other parts clearly.
Figure 3:
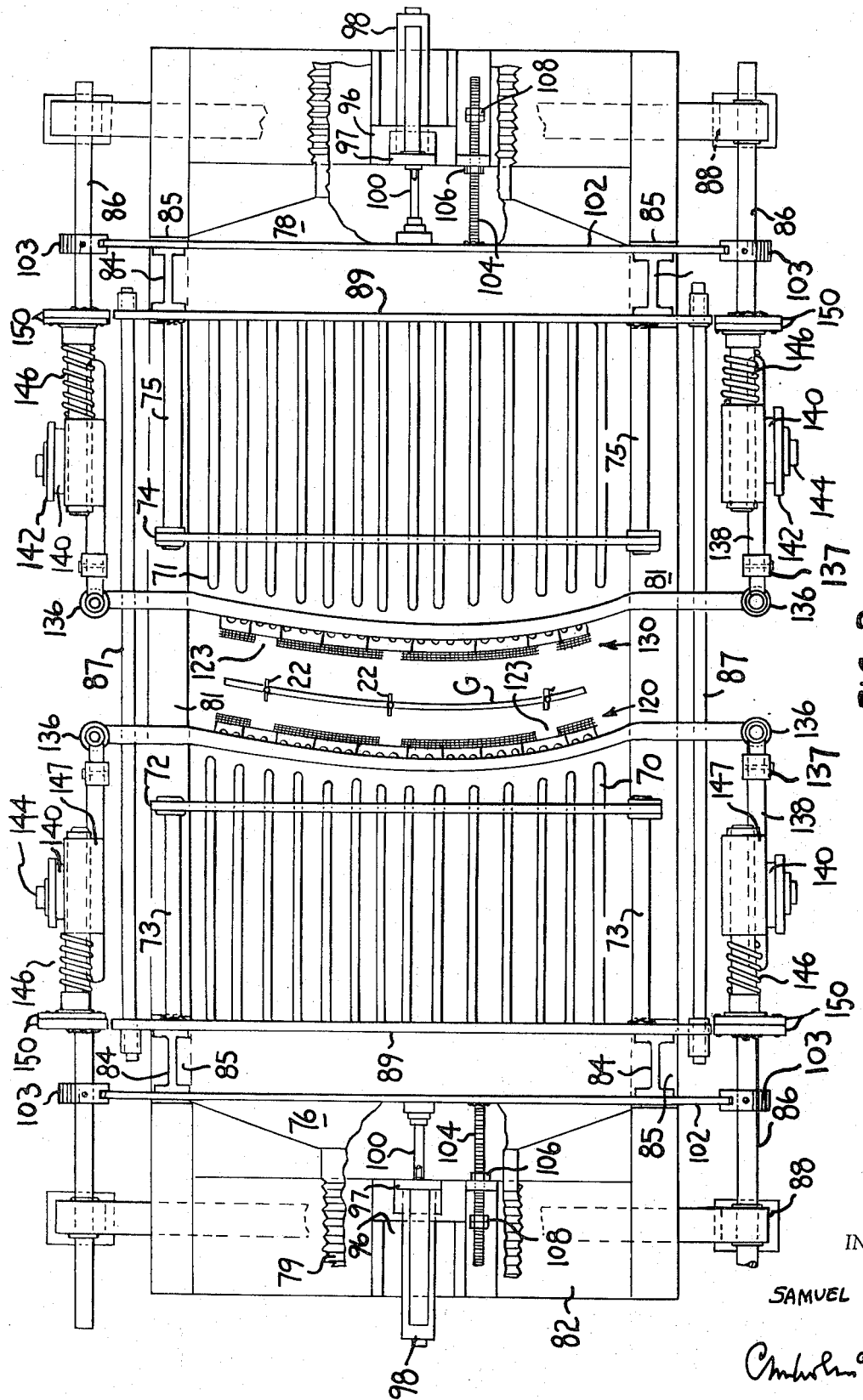
FIG. 3 is a plan view of the cooling station of FIG. 2 taken along the lines III — III of FIG. 2.

The tempering rings are shown in the FIGS. 2 and 3 in the retracted position. The stops 108 provided on the externally threaded rods 104 are adjusted to permit inward displacement of the plenum chambers and their attached nozzles so that the closest the tempering rings 120 and 130 appraoch one another equals the thickness of the glass sheet undergoing shaping plus a very small additional amount. preferably limited to the tolerance permitted by the customer for a deviation in shape of the glass sheet from the exact shape desired.

It can be seen from a study of FIGS. 2 and 3 that the glass surface facing the opposite arrays of nozzles have generally convex contour on one major surface and generally concave controu on the other major surface. Since it is impossible to introduce bent glass sheets between the arrays of nozzles unless the nozzles and their respective plenum chambers are retracted, a newly shaped glass sheet arrives at the cooling station 18 with the plenum chamber retracted as depicted in FIGS. 2 and 3. Immediately, pistons 98 extend piston rods 100 to the limit permitted by the adjustable stop nuts 108 on threaded rods 104 while tempering medium is blasted into the plenum chambers 76 and 78 for exhaust through the opposite arrays of nozzles to quench the glass with tempering medium.

The present invention works in a superior manner when a slightly greater pressure is applied through the nozzles facing the convex major glass sheet surface. This is preferably about two ounces per square foot difference in pressure with five inch spacing between each nozzle of one array to the opposing nozzle of the other array.

It has been stated that the tempering rings 120 and 130 have their serrated edges 134 of complementary curvature. The vairous adjustments enumerated above insure that the tempering rings are perfectly aligned with one anothe in outline and that their shapes are exactly complementary to one another so that the distance between edges 124 is uniform throughout the entire length of the rail 122.

When a slightly higher pressure is applied against the convex glass surface, the glass sheet G suspended from tongs 22 tends to tilt toward tempering ring 130 and away from tempering ring 120 until the concave surface of the glass sheet makes momentary contact with the wire mesh channel 126 covering the rail 122 of tempering ring 130. In this tilted position, the glass distance from nozzles 70 is increased and its distance from nozzles 71 decreased. In addition, there is a greater space between the tempering ring 120 and the glass sheet than there is betwen the tempering ring 130 and the glass sheet. Thus, air blasted against the opposite major surfaces of the glass tilted into contact with tempering ring 130 is freer to escape between tempering ring 120 and the convex glass surface and is less free to escape between the tempering ring 130 and the concave glass surface. Therefore, pressure builds up on the side facing tempering ring 130 until the pressure is sufficient to swing the glass from the tilted position where its convace surface is in contact with ring 130 to an opposite tilted position in which its convex surface is in contact with tempering ring 120. In this tilted position, pressure is greater against the convex surface of the glass and less against the concave surface of the glass. Thus, the glass sheet is forced to tilt again toward tempering ring 130. The shaped glass sheet thus flutteres between momentary contact of its opposite major surface against the opposite aligned tempering rings.

An initial pressure differential of two ounces per square inch against the opposite major surfaces is optimum at 5 inch spacing between opposite nozzle arrays to provide sufficient difference in pressure to start the fluttering of shaped glass sheets between the tempering rings. It is believed that spacing the tempering rings 120 and 130 from one another a distance slightly greater than the glass sheet thickness minimizes heat exchange between the tempering rings and the glass. Breakage occurred when the tempering rings simultaneously engaged the opposite glass sheet surfaces during chilling.

Figure 5:
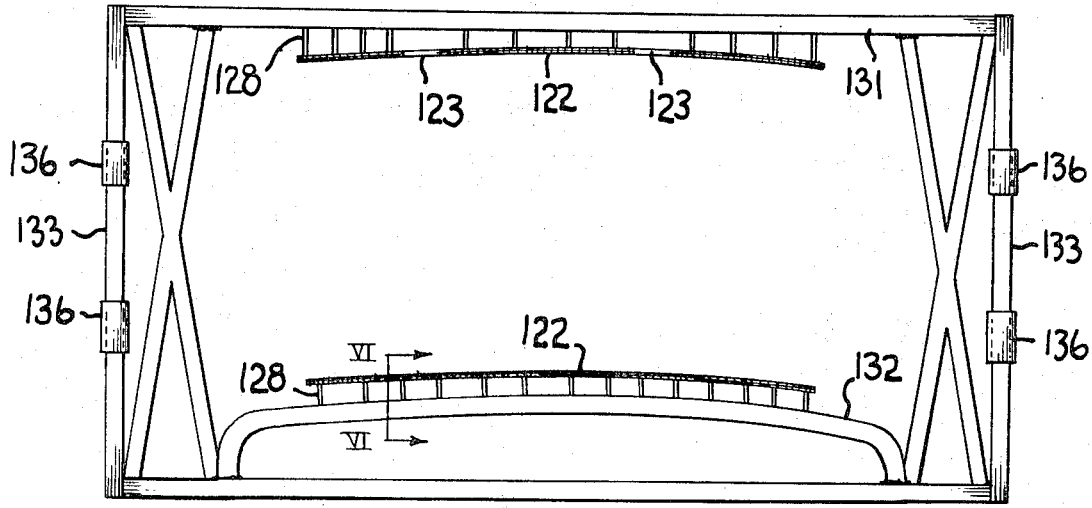
Figures 6, 7:
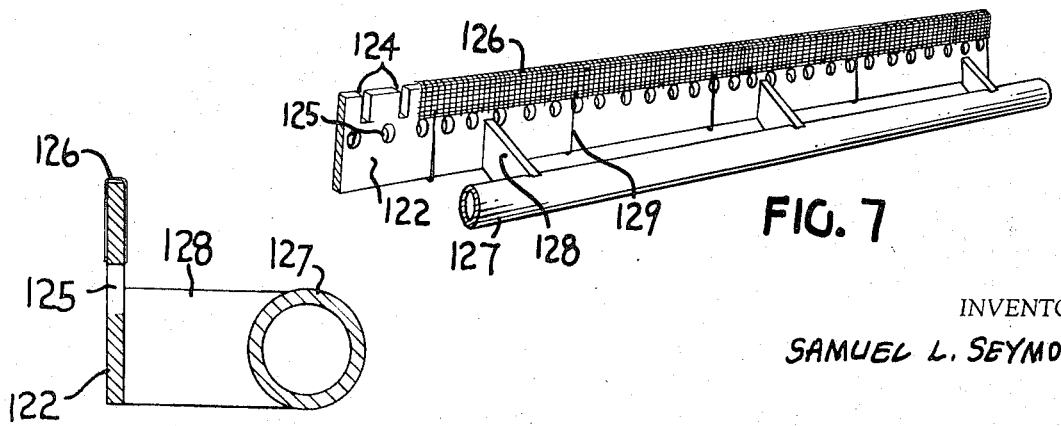
FIG. 6 is a cross-sectional view taken along the lines VI — VI of FIG. 4 or FIG. 5.
FIG. 7 is an enlarged perspective view of a portion of a tempering ring and its reinforcing structure.

In cases where glass sheets are bent to relatively shallow curvatures about one axis of curvature only, the guiding members that guide the glass into proper curvature may be provided by shaped upper and lower shaped rail members that engage only the upper and lower edges of the glass as depicted in FIG. 5. It is understood that even these upper and lower rail members may be made discontinuous where desirable. However, the rail members in the case of discontinuous rings should be of complementary shapes, should be properly aligned with one another and should be adequately reinforced and also protected from direct engagement with the glass by wire mesh channels 126 as in the FIG. 4 continuous tempering ring embodiment.

While a set of limit switches engaged by cams carried by various moving elements of a conveor system has been used with press bending and tempering apparatus, a brief description of the present system is provided to insure compliance with the requirement for a complete disclosure.

A first limit switch 40 is provided near the exit of the heating furnace 14 for actuation by cam 26 on each carriage 20. This limit switch operates a timer circuit that actuates a piston (not shown) that opens a horizontally displaceable exit door 15 for furnace 14. In addition, the first limit switch 40 actuates a clutch that disengages the rolls of the portion of the conveyor between limit switch 40 and the end of the shaping station 16 from the conveyor motor (not shown) through one gear ratio and engages the rolls through another gear ratio that causes the rolls in the transfer section to rotate at a high speed. The exit door operating piston is deactivated after a preset time sufficient for a carriage to clear the exit door 15, and the door resumes its normally closed position.

A second limit switch 41 is provided at the press bending station 16 for engagement by the cam 26 on each carriage 20 to actuate a timer circuit (not shown) that causes the piston assemblies 34 to move the shaping molds toward the opposite surfaces of a glass sheet, hold the molds in engagement for a desirable time and then retract.

Meanwhile, another limit switch 42 beyond the second limit switch 41 is engaged by cam 26 to actuate a a timer circuit (not shown) that controls the stopping of the conveyor section that transfers a carriage 20 from the furnace 21 to the shaping station 16 to control the position at which the carriage 20 stops so that the glass sheet G is aligned in a proper position between the complementary shaping molds. The timer circuit disengages a control clutch (not shown) and actuates a brake (not shown) to keep the transfer conveyor section stopped until the molds engage the glass sheet G. Then the timer releases the brake to clear the conveor 11 for moving the carriage 20 from the press bending station 16 to the cooling station 18 when it reactivates the clutch. The details of the conveyor system and its limit switch controls are well known in the art and form only part of the environment for the present invention, not of the invention per se.

Additional limit switches 140 and 142 are provided at the cooling station 18. Limit switch 140 is positioned for actuation by the cam 26 at the upper rail 24 of a carriage to actuate a timer that causes motor 90 to operate to reciprocate base frame 80 vertically, The timer also controls the blowing of air under pressure into the plenum chambers and the actuation of inward horizontal movement of the plenum chambers 76 and 78 and the tempering rings 120 and 130 relative to the base frame 80 by inward movement of piston rods 100 until the stops 108 engage the apertured vertical brackets 97 for a preset time until the motor 90 is inactivated, blower pressure is stopped and the piston rods 100 are retracted to the position defined by stops 106 engaging apertured vertical plate 97 to provide clearance for the cooled glass sheet to leave the cooling station and another sheet to enter. Limit switch 142 also disposed along the path of movement of cam 26, actuates another timer that actuates anoter stop mechanism similar to the one provided at the shaping station 16 to insure that the carriage stops at a proper position so that the glass sheet G is aligned with the tempering rings 120 and 130.

In a typical operation given by way of example to describe working embodiments of the present invention, glass sheets gripped along their upper edge portion by tongs were passed through a furnace to reach a surface temperature of about 1220 to 1230 degrees Fahrenheit. Each glass sheet was removed from the furnace on obtaining a temperature in the desired temperature range and was transferred to ths shaping station 16 in aout 4 ¾ seconds. When the glass reached the shaping station, it took about 2 seconds for the press bending molds to engage the glass sheet for pressurized engagement. The shaping members were held in pressurized engagement against the glass sheet for about 4 seconds. The glass sheet remained at the shaping station while the pressing molds were retracted from one another and then moved into the cooling station 18, taking an additional time of about 4 seconds for this latter operation.

At the cooling station the glass sheet was subjected to air blasts from arrays of nozzles arranged in horizontal rows on 2 inch centers with adjacent horizontal rows offset one inch from one another. The nozzles varied in length from 9 ½ inches to 12 inches in length from the respective plenum chambers and had a three-eights inch inner diameter. The base platform was reciprocated vertically through a displacement of 3 ½ inches. There were 21 horizontal rows of nozzles 2 inches apart from row to row and alternate rows had 39 nozzles and 38 nozzles, respectively. In treating glass sheets of different thicknesses, the following parameters were used: for glass having a nominal thickness of seven thirty-seconds inch, the inner ends of the nozzle openings extending from the opposed plenum chambers were spaced 8 inches apart and pressures of 9 ounces per square inch and 7 ounces per square inch applied toward the convex and concave glass surfaces respectively; for three-sixteenths inch nominal thickness glass, at a nozzle to nozzle spacing of 7 inches and the pressure increased to 11 ounces per square inch and 9 ounces per square inch against the respective surfaces; for glass having a nominal thickness of one-eighth inch, and the spacing between opposed nozzles 5 inches, the opposing pressures were 6 pounds 1 ounce per square inch and 5 pounds 15 ounces per square inch against the convex and concave glass surfaces, resqectively.

Without the tempering rings, the glass sheets were bent to configurations outside the tolerances permitted by the customer, necessitating adjusting the shape of the press bending molds to compensate for the distortion on cooling. Such adjustments failed to provide results that were consistent. The incorporation of glass guiding elements in the form of tempering rings at the cooling station, and, in instances of patterns requiring less severe curvature, upper and lower rails only or side rails only shaped to the portion of the outline configuration they represented, improved the compliance of the bent glass sheets to desired tolerances. However, the glass guiding elements had to be separated from one another a distance slightly greater than the glass sheet thickness to avoid glass breakage in the cooling station.

It is possible to increase the production rate of shaped, heat-strengthened glass sheets by having a succeeding glass sheet introduced between the shaping molds before the cooling of th preceding glass sheet is concluded. In apparatus where the glass is cooled while occupying the same position as it does during its shaping, the production rate must be limited to the time it takes to shape and heat strengthen each individual sheet in the series.

The form of the invention shown and described in this disclosure represents an illustrative preferred embodiment thereof. It is understood that various changes may be made without departing from the spirit of the invention as defined in the claimed subject matter that follows.

for example, the speicifc embodiment described has been limited to processing vertically oriented glass sheets. It is also within the province of the present invention to control the shape of glass sheets that are supported in either an oblique or horizontal plane during its cooling, wherein the lower surface of the glass rests on an outli, type mold ahving means to minimize the heat transfer between the mold and the glass such as a serrated shaped edge, a fine wire mesh channel, and the like, wherein an upper mold of complementary curvature is brought into close proximity to the upper surface of the shaped glass and greater force of tempering medium is applied against the bottom glass surface than the upper glass surface to cause said shaped glass sheet to flutter between said molds. The molds serve as shaped glass guiding members in a manner similar to the tempering rings 120 and 130 of the illustrative embodiment.

I claim:

1. A method of tempering a heated glass sheet comprising,
   supporting said glass sheet while at a temperature sufficient for tempering in an upright position in such a manner that the support means leaves substantially the entire peripheral edge surface exposed,
   cooling said heated glass sheet at said cooling station by applying tempering medium to the surfaces of said glass sheet at a rate sufficient to impart at least a partial temper to said glass sheet, and
   maintaining a pair of glass guiding members, each having an outline configuration conforming to the shape desired for at least a portion of the marginal portion only of the opposite surfaces of the glass sheet and free of any structure inward of said outline configuration adjacent to but slightly inward of its marginal edge in closely spaced relation and alignment to the opposite major surfaces of said glass sheet while directly exposing the entire peripheral edge surface and each said opposite major surface within said marginal glass sheet portion to sad tempering medium during said cooling while said guiding members are spaced from one another a distance slightly greater than the thickness of said glass sheet by approximately the tolerance permitted until said glass sheet is cooled sufficiently to impose at least a partial temper thereto , said glass guiding members being spaced close enough to maintain the desired shape of said glass sheet but from the glass a distance to permit intermittent or continuous tempering medium flow to move between the said glass guiding members and said glass sheet at a rate sufficient to reduce the adverse heat effects of the said glass guiding members on the glass sheet during the tempering operation.

2. A method as in claim 1, wherein said glass guiding members are in closely spaced relation to only the entire marginal portion of the opposite surfaces of said glass sheet during said cooling.

3. A method as in claim 1, said sheet being shaped, further applying said tempering medium at a slightly greater force against one major surface of the shaped glass sheet than the other major surface of said shaped glass sheet initially and continuing to apply said tempering medium against the opposite surfaces of said shaped glass sheet to flutter said sheets between said pair of shaped glass guiding members.

4. A method as in claim 3 wherein said heated glass sheet is shaped to have a major surface of generally convex configuration and an opposite major surface of concave configuration and said greater force of tempering medium is applied initially against said major surface of generally convex configuration.

5. A method as in claim 1 for tempering a series of glass sheets further including heating a succession of glass sheets in an enclosed hot atmosphere and removing one sheet at a time from said hot atmosphere for said delivery to said cooling station.

6. A method of shaping and heat-strengthening a series og glass sheets comprising supporting said glass sheets in an upright position in such a manner that the support means leaves substantially the entire peripheral edge surface of said sheets exposed, heating a succession of said glass sheets so supported in an enclosed hot atmosphere, removing one sheet at a time from said hot atmosphere, shaping said heated sheet to a curved configuration in a relatively cold atmosphere by engaging the opposite surfaces of said glass sheet between molds having complementary shaped surfaces, transferring said sheet in said realtively cold atmosphere to a cooling station, cooling said shaped, heated glass sheet at said cooling station by applying tempering medium to the exposed surfaces of said shaped glass sheet at a rate sufficient to impart at least a partial temper to said glass sheet, and maintaining a pair of shaped glass guiding members having an outline configuration conforming to the shape desired for at least a portion of the marginal portion of the opposite surfaces o the shaped glass sheet only and free of any structure inward of said outline configuration in closely spaced relation to the opposite surfaces of said bent glass sheet adjacent to but slightly inard of its marginal edge during said cooling while said shaped glass guiding members are spaced from one another a distance slightly greater than the thickness of said glass sheet by approximately the tolerance permitted for deviations from said desired shape until said shaped glass sheet is cooled sufficiently to impose at least a partial temper thereof and to set its shape within said tolerance, said glass guiding members being spaced close enough to maintain the desired shape of said shaped glass sheet but from the glass a distance to permit intermittent or continuous tempering medium flow to move between the said glass guiding members and said shaped glass sheet at a rate sufficient to reduce the adverse heat effects of the said glass guiding members on the shaped glass sheet during the tempering operation.

7. A method as in claim 6 wherein a second glass sheet in said series is removed from the furnace for shaping before the immediately preceding glass sheet in the series is removed from said cooling station.

8. Apparatus for shaping and heat-treating a glass sheet comprising, means to heat said glass sheet to its deformation temperature, means to transfer said heated glass sheet into a shaping station, a pair of complementary molds at said shaping station, means to move said molds between a retracted position for receipt fo said heated glass sheet and into a glass engaging position to impress a shape onto said heated glass sheet and then retract to permit the shaped glass sheet to leave said shaping station, a glass cooling station spaced from said glass shaping station, means to convey said shaped glass sheet from said shaping station to said cooling station, means to support said glass sheet in an upright position in such a manner that the support means leaves substantially the entire peripheral edge surface of said sheet exposed, said cooling station comprising a pair of opposite plenum chambers, means to dispense tempering medium into said plenum chambers for exhaust through opposite arrays of nozzles against the opposite surfaces of a shaped glass sheet, glass guiding members consisting essentially of outline means defining a space slightly smaller than and similar in outline to the outline of said glass sheet attached to each of said plenum chambers and in front of said nozzles and having contours conforming to at least a portion of the marginal portion only of said glass sheet for alignment with the marginal portions only of the opposite major surfaces of said glass sheet adjacent the outline of said glass sheet only and free of any structure within said marginal portion, means for moving said plenum chambers including said arrays of nozzles and said glass guiding members from a retracted position to permit entry of a glass sheet between said glass guiding members and a closed position, means to limit inward movement of said glass guiding members to a position where they are in close proximity to the opposite major surfaces of said glass sheet but not so lose that they simultaneously contact both said major surfaces, so that tempering medium applied through said opposed arrays of nozzles against said opposite major surfaces of said glass sheet is free to flow at least intermittently between each major surface of said glass sheet and said shaped guiding member that said major surface faces glass sheet and said shaped guiding member that said major surface faces during said application of tempering medium.

9. Apparatus as in claim 8, wherein at least one of said glass guiding members is attached to said plenum chamber by spring loading so constructed and arranged as to permit freedom of movement of said glass guiding member rearward but to limit the forward motion of said glass guiding member.

10. Apparatus as in claim 8 wherein said glass guiding members comprise a pair of ring like members having complementary shaped surfaces conforming to the shape desired adjacent the outline of said bent glass sheet.

11. Apparatus as in claim 10, wherein said rings are continuous and have serrated edges facing the portion occupied by a glass sheet.

12. Apparatus as in claim 11, wherein a fine wire mesh screen covers said serrated edges.

13. Apparatus as in claim 8, wherein said glass guiding members comprise a pair of opposite series of rail sections forming a pair of discontinuous rings having shapes conforming to a portion of the outline of said shaped glass sheet in the vicinity of its marginal portion.

14. Apparatus as in claim 8, further including mean for moving said plenum chambers relative to said glass guiding members in a direction transverse to the direction of mvoement between said retracted position and said closed position.

15. A glass cooling station for tempering a shaped heated glass sheet comprising a pair of opposed plenum chambers, means for dispensing tempering medium into said plenumchambers for exhaust through opposite arrays of nozzles against the opposite surfaces of a shaped glass sheet, means to support said glass sheet in an upright position in such a manner that the support means leaves substantially the entire peripheral edge surface of said sheet exposed, a glass guiding member consisting essentially of outline means defining a space slightly smaller than and similar in outline to the outline of said glass sheet attached to each of said plenum chambers and in front of said nozzles and having contours conforming to at least a portion of the marginal portion only of said glass sheet and free of any structure inward of said outline configuration for alignment with the opposite major surfaces of said glass sheet adjacent to but slightly inward of its marginal edge only, means for moving said plenum chambers including said arrays of nozzles and said glass guiding members from a retracted position permitting entry of a glass sheet between said glass guiding members and a closed position, means to limit inward movement of said glass guiding members to a position where they are in close proximity to the opposite major surfaces of said glass sheet but separated from one anothe by a maximum distance equal to the sum of the glass sheet thickness and the tolerance permitted, so that tempering medium applied through said opposed arrays of nozzles against said opposite major surfaces of said glass sheet is free to flow at least intermittently between each major surface of said glass sheet and said shaped guiding member that said major surface faces durin said application of tempering medium.

16. A cooling station as in claim 15, wherein at least one of said glass guiding members is attached to its respective plenum chamber by spring loading so constructed and arranged as to permit freedom of movement of said glass guiding member rearward but to limit the forward motion of said glass guiding member.

17. A cooling station as in claim 15, wherein said glass guiding members consist essentially of a pair of ring like members having complementary shaped surfaces conforming to the shape desired adjacent to and slightly within the outline of said bent glass sheet.

18. A cooling station as in claim 15, wherein said rings are continuous and have serrated edges facing the portion occupied by a glass sheet.

19. A cooling station as in claim 18, wherein a fine wire mesh screen covers said serrated edges.

20. A cooling station as in claim 15, wherein said glass guiding members comprise a pair of opposite series of rail sections forming a pair of discontinuous rings having shapes conforming to a portion of the outline of said shaped glass sheet in the vicinity of and slightly within its marginal portion.

21. A cooling station as in claim 15, further including means for moving said plenum chambers relative to said glass guiding members in a direction transverse to the direction of movement between said retracted position and said closed position.

22. A method of tempering a heated glass sheet comprising,
supporting said glass sheet while at a temperature sufficient for tempering in an upright position in such a manner that the support means leaves substantially the entire peripheral edge surface exposed,
cooling said heated glass sheet at said cooling station by applying tempering medium to the surface of said glass sheet at a rate sufficient to impart at least a partial temper to said glass sheet, and
maintaining a pair of glass guiding members, each having an outline configuration conforming to the shape desired for at least a portion of the marginal portion only of the opposite surfaces of the glass sheet and free of any structure inward of said outline configuration adjacent to but slightly inward of its marginal edge in closely spaced relation and alignment to the opposite major surfaces of said glass sheet while directly exposing the entire peripheral edge surface and each said opposite major surface within said marginal glass sheet portion to said tempering medium during said cooling while said guiding members are spaced from one another a distance slightly greater than the thickness of said glass sheet by approximately the tolerance permitted until said glass sheet is cooled sufficiently to impose at least a partial temper thereto, said tempering medium being applied to the opposite major surfaces of said glass sheet so as to force one of the surfaces of said sheet into contact with one of said glass guiding members in a region of said major surface of the glass sheet inwardly of the marginal edge thereof thereby to impede the flow of tempering medium between the glass sheet and said glass guiding member in contact therewith until the force of the tempering medium applied to the major surface of the glass sheet in contact with said glass guiding member is increased to an amount sufficient to move the glass sheet away from the glass guiding member in ontact therewith and the opposite surface of the glass sheet toward the opposite glass guiding member whereby to provide intermittent increases of the force of the tempering medium to the opposite major surfaces of the glass sheet and intermittent movement of the glass sheet toward and away from each glass guiding member so a to provide at least intermittent flow of said tempering medium between each major surface of said glass sheet and said glass guiding member that each said major surface faces during said cooling.

* * * * *

UNITED STATES PATENT OFFICE
CERTIFICATE OF CORRECTION

Patent No. 3,776,708                    Dated December 4, 1973

Inventor(s) Samuel L. Seymour

It is certified that error appears in the above-identified patent and that said Letters Patent are hereby corrected as shown below:

Column 12, Claim 1, line 50 "sad" should be --said--

Column 13, Claim 6, line 21, "og" should be --of--
           line 41, "o" should be --of--
           line 45, "inard" should be --inward--
           line 52, "thereof" should be --thereto--.

Column 14, Claim 8, line 8, "fo" should be --of--
           line 46, "lose" should be --close--
           lines 54 and 55, please delete --glass sheet and said shaped guiding member that said major surface faces--.

Column 15, Claim 14, line 12, "mean" should be --means--
           line 15, "mvoement" should be --movement--.

Claim 15, line 20, "plenumchambers" should be --plenum chambers--
           line 42, "anothe" should be --another--
           line 49, "durin" should be --during--.

Column 16, Claim 22, line 21, "surface" should be --surfaces--.
           line 45, "merginal" should be --marginal--
           line 53, "ontact" should be --contact--
           line 60, "a" should be --as--.

Signed and sealed this 16th day of April 1974.

(SEAL)
Attest:

EDWARD M.FLETCHER,JR.                   C. MARSHALL DANN
Attesting Officer                       Commissioner of Patents